United States Patent [19]

Sakamoto

[11] 4,326,228
[45] Apr. 20, 1982

[54] MAGNETIC TRANSDUCER SUPPORTING APPARATUS

[75] Inventor: Hitoshi Sakamoto, Kanagawa, Japan

[73] Assignee: Sony Corporation, Tokyo, Japan

[21] Appl. No.: 126,019

[22] Filed: Feb. 29, 1980

[30] Foreign Application Priority Data

Mar. 9, 1979 [JP] Japan .................. 54-27541

[51] Int. Cl.³ .................. G11B 21/18; G11B 21/24
[52] U.S. Cl. ........................................ 360/109
[58] Field of Search .................... 360/109, 77, 10

[56] References Cited

U.S. PATENT DOCUMENTS 4,099,211  7/1978  Hathaway ............... 360/109
4,233,637 11/1980  Kubota ................. 360/109 X

FOREIGN PATENT DOCUMENTS 833241   5/1956  United Kingdom .
961606  10/1961  United Kingdom .
1014923  9/1962  United Kingdom .
1470111  3/1974  United Kingdom .
1465863  1/1975  United Kingdom .

Primary Examiner—James W. Moffitt
Assistant Examiner—Donald McElheny, Jr.
Attorney, Agent, or Firm—Lewis H. Eslinger; Alvin Sinderbrand

[57] ABSTRACT

In apparatus for supporting a magnetic transducer or head in a video tape recorder and which includes a cantilevered support member mounted at one end, for example, on a rotary portion of a tape guide drum, with the head secured on the opposite or free end of the support member in transducing relation to the tape wound about the drum; at least a part of the support member extending from its mounted end is constituted by a bi-morph leaf, and conductive layers are bonded to opposite surfaces of the bi-morph leaf and are absent from at least the free end portion of the support member so that flexing of the bi-morph leaf occurs between the conductive layers in response to the application of a drive signal to the conductive layers for deflecting the head laterally in respect to the plane of movement of the head with the rotary drum portion, and such flexing is excluded from at least the free end portion of the support member for facilitating the secure attachment of the head thereto and for minimizing the angular deviation of the active face of the head from the tape that accompanies the lateral deflecting of the head.

23 Claims, 9 Drawing Figures

FIG.6
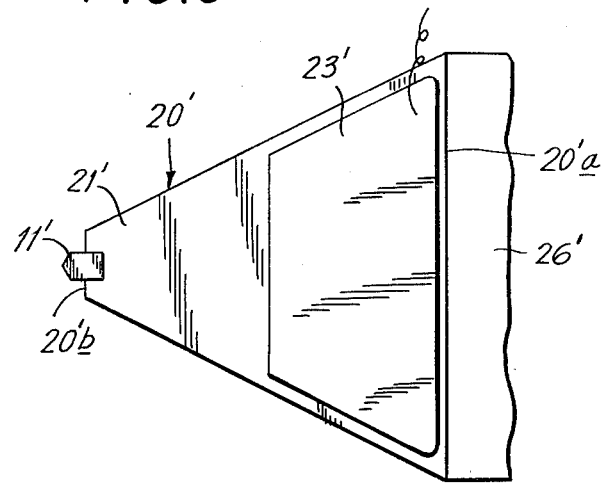
FIG.5
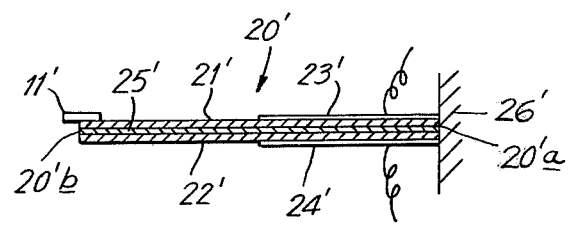
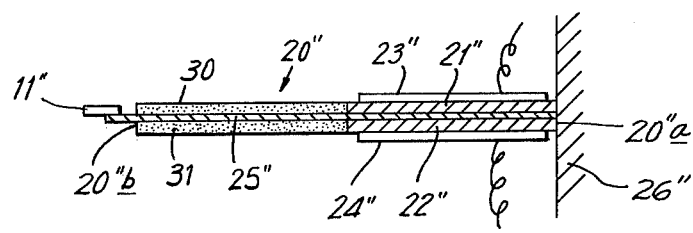
FIG.7

MAGNETIC TRANSDUCER SUPPORTING APPARATUS

BACKGROUND OF THE INVENTION

1. Field of the Invention

This invention relates generally to apparatus for supporting a magnetic transducer or head, and has particular application to a video tape recorder (VTR) in which stop-motion, slow-motion or fast-motion pictures as well as normal-motion pictures can be reproduced.

2. Description of the Prior Art

In a conventional VTR, a rotary transducer or head assembly is provided with one or more magnetic transducers which scan successive parallel tracks on a magnetic tape so as to record and/or reproduce video signals in such tracks. In general, while the one or more transducers or heads rotate so as to scan across the tape, the tape itself is transported longitudinally. In a typical so-called helical scan VTR, each transducer or head is mounted on a rotary portion of a guide drum so as to scan magnetic tape which is helically wrapped about at least a portion of the circumference of the guide drum. During recording, a tracking servo system controls the rotation of the one or more transducers with respect to the tape movement, and control pulses are recorded on a marginal portion of the tape. During normal reproduction, the same or a similar servo system is used to synchronize the movement of the tape in respect to the rotation of the transducers based on the reproduced control pulses, whereby the scanning path of each of the heads or transducers is made to coincide with one of the previously recorded tracks and an accurate video picture can be displayed in response to the reproduced video signal.

Recently, VTRs have been provided which are capable of various modes of reproducing operation, such as, "stop or still-motion", "slow-motion" and "quick or fast-motion" reproducing operations, in addition to the normal reproducing mode. In these various reproducing modes other than the normal mode, the tape speed differs from the speed during recording. Consequently, the scanning path of each head or transducer is inclined, or angularly disposed, with respect to the directions of the recorded tracks. By reason of the foregoing, in the various reproducing modes other than the normal mode, guard band noise or crosstalk will result from the tracking errors or inclination of the scanning paths of the heads relative to the recorded tracks.

It has been proposed, for example, in U.S. Pat. No. 4,080,636, to correct such tracking errors in the scanning path of each rotary head or transducer by mounting the latter at the free end of a cantilevered support member in the form of a so-called bi-morph leaf which is normally planar and flexes arcuately along the entire length of the support member in a direction, and by an amount depending upon the polarity and amplitude of an electrical drive signal applied thereto. Moreover, the bi-morph leaf is oriented and the drive signal applied thereto is suitably controlled so as to deflect the transducer supported thereby in directions that are transverse or perpendicular in respect to the plane of rotation of the head or transducer, and hence lateral in respect to the directions of the record tracks, whereby to cause the head scanning path to coincide with the record track being scanned thereby. Although tracking errors are minimized or avoided by the use of a suitably controlled bi-morph leaf for supporting the transducer or head, as aforesaid, it will be appreciated that arcuate flexing of the bi-morph leaf for deflecting the head mounted at its free end laterally in respect to a record track being scanned causes the active face of the head, that is, the surface of the transducer or head at which the usual gap is provided, to deviate angularly from the tape surface. At the extremes of the lateral deflection of the head, the contact angle error or angular deviation of the active face of the magnetic transducer or head in respect to the surface of the tape or other record medium substantially reduces the signal coupling and, thereby, adversely affects the stability of the reproduced picture.

In order to avoid the foregoing problem, it has been proposed, for example, in U.S. Pat. No. 4,099,211, to form the cantilevered support member for the magnetic transducer or head of independently deflectable inner and outer bi-morph leaf elements having opposite polarizations and being crosswired so as to be flexed in opposite or reverse directions upon application of the electrical drive signal thereto. By reason of the foregoing arrangement, the contact angle error or inclination of the active face of the transducer or head in respect to the record medium surface may be decreased, or even eliminated as the transducer or head is deflected in a direction extending laterally to its plane of rotation. However, the manufacture of such cantilevered support members composed of inner and outer, oppositely polarized bi-morph elements, and the crosswiring thereof are undesirably complex and costly.

Further, in mounting a magnetic transducer or head on a bi-morph leaf for deflection of the head laterally in respect to its plane of rotation upon flexing of the bi-morph leaf, difficulties are encountered in affixing the transducer or head to the bi-morph leaf at a region of the latter at which such flexing occurs. Moreover, in cases where the cantilevered support member for the magnetic transducer or head is formed of one or more bi-morph leaf elements, as aforesaid, the support member tends to be relatively heavy, particularly adjacent its free end carrying the transducer or head so that the resulting head assembly has a relatively slow response to rapid changes in the electrical drive signal.

OBJECTS AND SUMMARY OF THE INVENTION

Accordingly, it is an object of this invention to provide a mounting for a transducer or head, for example, in a helical scan VTR, by which the mounted head can be conveniently deflected laterally in respect to its scanning path on a record medium while reducing the contact angle error of the head in respect to the record medium surface for maintaining a substantial signal coupling between the record medium and head in spite of the deflection of the latter.

More specifically, it is an object of this invention to provide a cantilevered support member mounting a magnetic transducer or head at its free end for scanning along a record track on a tape or other record medium, and in which at least a part of the support member is electrostrictive, for example, constituted by a bi-morph leaf, so that flexing of the electrostrictive part causes deflecting of the transducer or head laterally in respect to the direction along the record track to eliminate tracking errors, and further in which the cantilevered support member is constructed and arranged to reduce the degree of contact angle error resulting from lateral deflection of the head.

A further object of the invention is to provide a mounting for a magnetic transducer or head, as aforesaid, by which the secure attachment of the transducer or head to the free end portion of the cantilevered support member is facilitated.

Still another object of the invention is to provide a support member for mounting a magnetic transducer or head, as aforesaid, providing an improved response characteristic of the bi-morph leaf or electrostrictive part of the support member for deflection of the transducer or head in a lateral direction in respect to the application of an electrical drive signal to the bi-morph leaf or electrostrictive part of the support member.

In accordance with an aspect of this invention, an apparatus for mounting a magnetic head in transducing relation to an elongated track on a magnetic tape or other record medium comprises a mounting structure, such as, a rotatable guide drum portion in a VTR, movable relative to the record medium generally in the direction along the record track, a cantilevered support member having one end fixed to the mounting structure for movement with the latter relative to the record medium, and an opposite or free end portion at which the magnetic head is secured in transducing relation to the record medium, with at least a part of the support member extending from its fixed end being electrostrictive for displacement of the head in directions lateral of the track in response to flexing of the electrostrictive part, and conductive layers on the electrostrictive part of the support member for causing flexing of the electrostrictive part between the conductive layers upon application of a drive signal to the conductive layers, such conductive layers being absent from at least the free end portion of the support member at which the head is secured for excluding the flexing action from at least such free end portion. Preferably, the conductive layers extend from the fixed end of the support member in the direction toward the opposite or free end portion for a distance which is from approximately 40% to approximately 85% of the dimension measured across the support member from its fixed end to its free end.

In preferred embodiments of this invention, the electrostrictive part of the support member is constituted by a bi-morph leaf element including a central vane member and two piezoelectric ceramic members bonded between the conductive layers to opposite surfaces of the vane member. In one embodiment, the vane member and the piezoelectric ceramic members are substantially coextensive with the dimension measured across the support member from the fixed end to the free end thereof, and the conductive layers cover substantially less than the full extent of the piezoelectric ceramic members in the direction of such dimension, with the head being adhesively bonded directly to one of the piezoelectric ceramic members at a surface portion thereof which is free or rid of the conductive layers. In another embodiment of the invention, the piezoelectric ceramic members and the conductive layers are substantially coextensive in the direction of the dimension measured across the support member and extend from the fixed end of the cantilevered support member only the mentioned distance which is from approximately 40% to approximately 85% of such dimension, and the vane member extends beyond the piezoelectric ceramic members and has the magnetic head adhesively bonded thereto.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 5 is a sectional view similar to that of FIG. 3, but illustrating a magnetic head support member according to an embodiment of the present invention that is suitable for use in a VTR of the type shown on FIG. 1;

FIG. 6 is a plan view of the magnetic head support member shown on FIG. 5;

FIG. 7 is a sectional view similar to that of FIG. 5, but illustrating a support member for a head or transducer in accordance with another embodiment of this invention;

DETAILED DESCRIPTION OF THE PREFERRED EMBODIMENTS

For the purpose of simplification, and to facilitate understanding of the present invention, the latter is hereinafter described in detail in its application to an apparatus for recording and/or reproducing video signals, such as, a video tape recorder (VTR). However, the problems to which the invention is addressed, and the solution of those problems, as disclosed herein, are not limited to video signal recording and/or reproducing apparatus, Hence, it will be understood that the invention is similarly applicable to other types of analog or digital signal recording devices.

Figure 1:
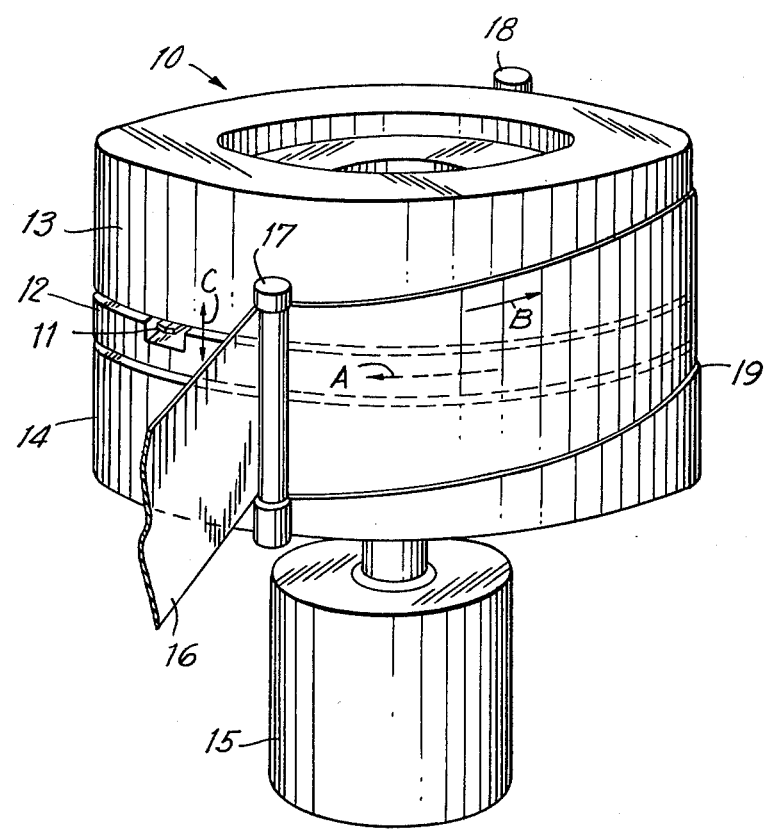
FIG. 1 is a schematic perspective view of a portion of a helical scan VTR in which the present invention can be advantageously employed.

Referring first to FIG. 1, it will be seen that a typical rotary head scanning device 10, for example, as used in a video tape recorder (VTR), includes two diametrically opposed magnetic record/playback transducers or heads 11 (only one of which appears on FIG. 1) adapted to rotate with a disk 12 about a central axis of the latter. The rotary disk 12 is interposed between upper and lower drum portions 13 and 14, and is suitably driven, as by a motor 15. A record medium in the form of a magnetic tape 16 is guided, as by rollers 17 and 18 and an inclined guide shoulder 19, to extend helically about at least a 180° angular extent of the periphery of a tape guide drum constituted by drum portions 13 and 14 and rotary disk 12 therebetween so that heads 11 will scan successive, parallel skewed tracks on tape 16. More particularly, as heads 11 are rotated in the direction of the arrow A on FIG. 1, tape 16 is advanced or made to travel longitudinally in the direction of the arrow B, for example, by the cooperative action of a rotated cap stand and pinch roller (not shown) between which the tape is engaged, so that heads 11 alternately scan and record information signals in alternately arranged parallel tracks T which are skewed relative to the longitudinal direction or direction of travel of tape 16, as shown on FIG. 2.

During a signal recording operation and during a signal reproducing operation in the normal mode, the speed with which tape 16 is driven in the longitudinal direction is the same, and suitable servo control circuitry (not shown) is usually provided to compensate for relatively small changes in the speeds at which the rotary heads and the tape are driven, and for tape stretching or shrinkage differences from one apparatus to another. In a typical video recording apparatus, each of the heads 11 records a complete field of video signal information in a respective record track T scanned thereby and, for such purpose, disk 12 and the heads 11 mounted thereon are rotated at a speed of 30 r.p.s. in the case of recording a NTSC television signal.

However, a video recording and/or reproducing apparatus or VTR is desirably capable of functioning in a "non-normal" reproducing mode in addition to the normal reproducing mode. As noted above, in the normal reproducing mode, the conventional servo control circuitry (not shown) can be effective to suitably control the rotation of heads 11 by motor 15 so that such heads alternately scan the record tracks T for accurately reproducing the video signal information recorded therein. However, in a non-normal reproducing mode, such as, a slow-motion, stop-motion or fast-motion reproducing mode, the heads 11 continue to be rotated at the same speed as during recording, but the speed of advancement of the tape 16 is changed. Thus, for example, in a stop-motion reproducing mode, the record medium or tape 16 is at rest or stationary with the result that heads or transducers 11 repetitively scan the same track. A common problem in any of the non-normal reproducing modes is that the scanning path traversed by each of the heads 11 no longer exactly coincides with a previously recorded record track. Rather, the scanning path of each head is inclined or angularly disposed with respect to the record track. For example, as shown on FIG. 2, if the scanning path of the head 11 is as indicated at $p_0$ for the normal reproducing mode in which the tape 16 is driven in the direction of the arrow B at the normal speed, then, in the case of the stop-motion reproducing mode in which the tape is at rest, the scanning path of the head 11 will be as indicated at $p_1$, that is, substantially inclined in respect to the record track. Because of the illustrated inclination or angular disposition of the scanning path $p_1$ in respect to the record track T, the head 11, as it deviates from the record track being scanned, will pick up noise from guard bands separating successive record tracks, or the head will pick up cross-talk from an adjacent track in the case where the successive record tracks are recorded without guard bands therebetween for maximum utilization of the tape 16.

Figure 2:
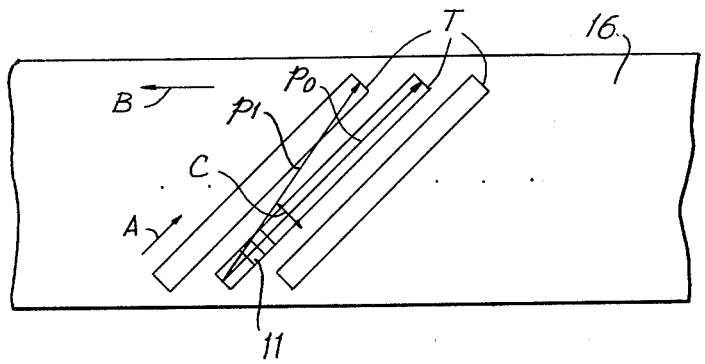
FIG. 2 is a schematic view of a section of a magnetic tape on which video or other information signals have been recorded in successive parallel tracks by means of the VTR of FIG. 1.
Figure 3:
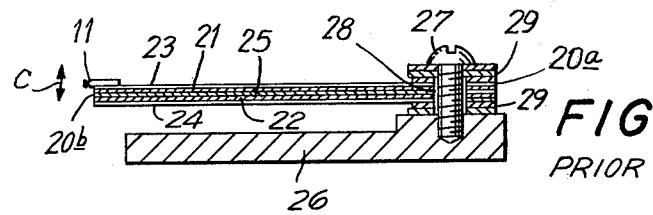
FIG. 3 is an enlarged sectional view illustrating a support member of the prior art for mounting each magnetic head or transducer in a VTR of the type shown on FIG. 1.

If each of the heads 11 is mounted on an adjustable support member, such as, a so-called bi-morph leaf, which is adapted to deflect in a direction indicated by the arrows C on FIGS. 1 and 2, that is, perpendicular or lateral to the scanning path of the respective head, in response to an electrical drive signal applied across the bi-morph leaf, for example, as suggested in U.S. Pat. No. 4,080,636, the amplitude and polarity of such electrical drive signal can be suitably controlled so as to provide a varying deflection of the head as the latter moves along its scanning path for causing such path to coincide with the record track being scanned by the head. As shown particularly on FIG. 3, such an adjustable support member 20 according to the prior art is constituted by a bi-morph leaf composed of two piezoelectric ceramic members 21 and 22 sandwiched and bonded between conductive layers or electrodes 23 and 24 and being conductively bonded, as by epoxy adhesives, to opposite sides of a central brass vane member 25. One end portion 20a of bi-morph leaf 20 is clamped on a protective base shoe member 26, for example, by a bolt 27 which extends through an electrically insulating sleeve 28 and washers 29 and is threaded into a raised portion of shoe member 26 which is suitably secured on rotary disk 12 (not shown on FIG. 3) so that the respective head or clip 11 on the free end 20b of leaf 20 will project slightly beyond the peripheral surface of disk 12. In support member 20 according to the prior art, the piezoelectric ceramic members 21 and 22 and the conductive layers 23 and 24 are shown to be coextensive with the central vane member 25 at least in the direction extending from its clamped end 20a to its free end 20b.

As is well known in the art, the directions of polarization of ceramic members 21 and 22 may be either the same or opposed, depending upon how the conductive layers or electrodes 23 and 24 and the central vane member 25 are to be energized. For the purposes of such energization, suitable leads (not shown) extend from electrodes 23 and 24 and vane member 25, respectively, for connection to a voltage source (not shown) by which an electrical drive signal is applied to establish an energizing electric field between conductive layers 23 and 24 and the central vane member 25. In response to such electrical fields, the piezoelectric ceramic members 21 and 22 exposed thereto cause arcuate flexing of the bi-morph leaf 20.

Figure 4:
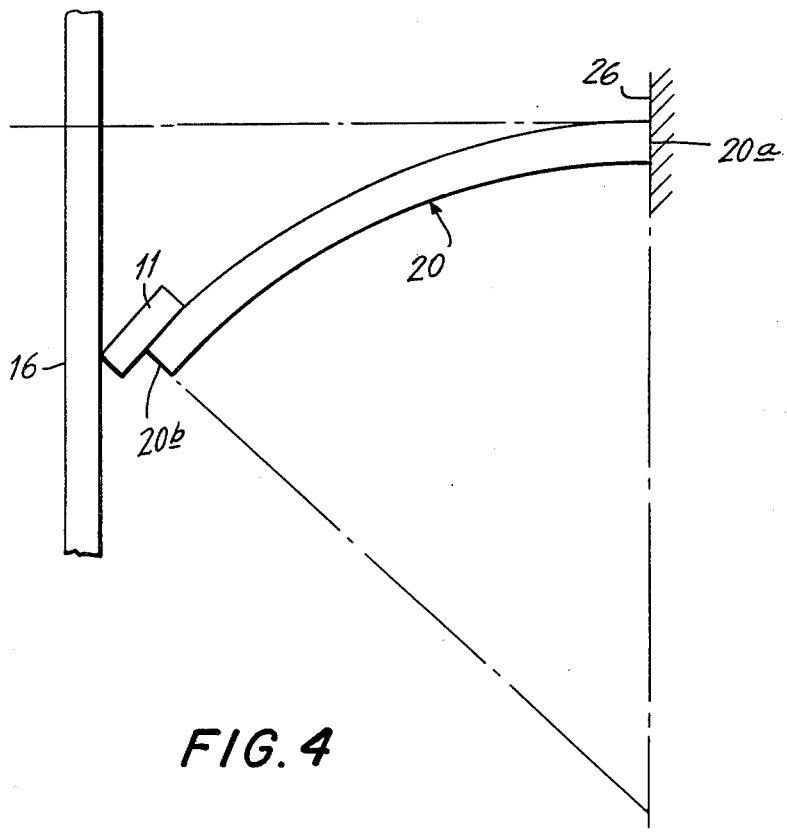
FIG. 4 is an enlarged diagrammatic view illustrating the manner in which the support member of FIG. 3 causes an undesirable contact angle error to occur at an extreme of the lateral deflection of the mounted head or transducer.

As shown diagrammatically on FIG. 4, in the case of the bi-morph leaf 20 according to the prior art which has the outer conductive layers or electrodes 23 and 24 extending continuously from the clamped end 20a to the free or deflected end 20b of the leaf, the arcuate flexing of the bi-morph leaf 20 occurs substantially uniformly at all locations along the latter from its clamped or fixed end 20a to its free or deflected end 20b. The arcuate flexing of bi-morph leaf 20 at the portion thereof adjacent its free end 20b gives rise to difficulties in maintaining the secure attachment of the transducer or head 11 thereto. In other words, if head 11 is adhesively bonded to a surface of bi-morph leaf 20 adjacent its free end, the arcuate flexing or working of such surface tends to destroy the adhesive bond of the head thereto. Further, in the case where the conductive layers or electrodes 23 and 24 extend to the free end 20b of the bi-morph leaf, it is necessary to provide an insulating layer (not shown) between the magnetic head 11 and the adjacent conductive layer 23 so that a drive signal applied to the latter will not influence the signal being recorded or reproduced by head 11. It will also be seen that, by reason of the arcuate flexing along the entire length of bi-morph leaf 20 according to the prior art, at least at the extremes of the lateral deflections of head 11 there is an undesirably large contact angle error or angular deviation of the contact face 11a of head 11 relative to the surface of the tape or other record medium 16. The large angular deviation or contact angle error produces an increasing partial separation between the gap of the head and the recording medium in the plane of the width and depth dimensions of the gap, and such partial separation can result in signal loss because of reduced signal coupling between the head and record medium. The signal losses are particularly significant and can seriously degrade the reproducing performance at high signal frequencies such as are encountered when using the well-known frequency modulation technique for recording and reproducing video signals.

Referring now to FIGS. 5 and 6, it will be seen that, in the embodiment of the invention there illustrated, a cantilevered support member 20' is again mounted at one end 20'a, for example, by clamping to a protective base shoe member indicated diagrammatically at 26', for rotation with a rotary portion of the tape guide drum, and the respective transducer or head 11' is secured on the opposite or free end 20'b of support member 20' so as to be in transducing relation to the tape wound about the guide drum. In the embodiment of FIGS. 5 and 6, support member 20' is again constituted by a bi-morph leaf composed of piezoelectric ceramic members 21' and 22' which are coextensive with, and adhesively bonded to the opposite surfaces of a central vane member 25'. As shown particularly on FIG. 6, the central vane member 25', which functions as a conductive substrate, and the piezoelectric members 21' and 22' bonded thereto are desirably trapezoidal in configuration. In a particularly desirable practical embodiment of the invention, the piezoelectric members 21' and 22' are formed of PbZrTiO$_x$, while the conductive substrate or vane member 25', which also functions as an intermediate electrode and supporting plate, is desirably made of a conductive metal, for example, Ti, or of carbon fibers.

The cantilevered support member 20' is further shown to include conductive layers 23' and 24' which are suitably bonded to the outer surfaces of piezoelectric members 21' and 22', respectively, and which, in accordance with this invention, are absent from at least the free end portion of support member 20'. More particularly, in the embodiment of FIGS. 5 and 6, the conductive layers 23' and 24' extend from the clamped or fixed end 20'a of support member 20' over members 21' and 22', respectively, to approximately the midpoint between the fixed and free ends 20'a and 20'b, respectively, of the support member. Further, in the embodiment illustrated on FIGS. 5 and 6, the magnetic transducer or head 11' is adhesively bonded directly to the surface of piezoelectric member 21' adjacent the free end 20'b, at which the conductive layers 23' and 24' are absent.

In operation of the cantilevered support member 20', appropriate electrical deflection potentials constituting a drive signal are applied to conductive layers 23' and 24' and to the central conductive substrate or vane member 25' so as to establish electrical fields by which support member 20' is made to arcuately flex. However, in accordance with the present invention, such arcuate flexing of support member 20' occurs only at that portion of the length thereof along with conductive layers 23' and 24' are provided. Thus, in the case of the embodiment of FIGS. 5 and 6, the application of a drive signal by way of conductive layers 23' and 24' causes arcuate flexing of support member 20' from its clamped or fixed end 20'a to approximately the midpoint between its ends 20'a and 20'b, while the remainder of support member 20' extending from its midpoint to the free end 20'b remains substantially flat in a plane that is approximately tangential to the curvature of member 20' at its midpoint.

Figure 8:
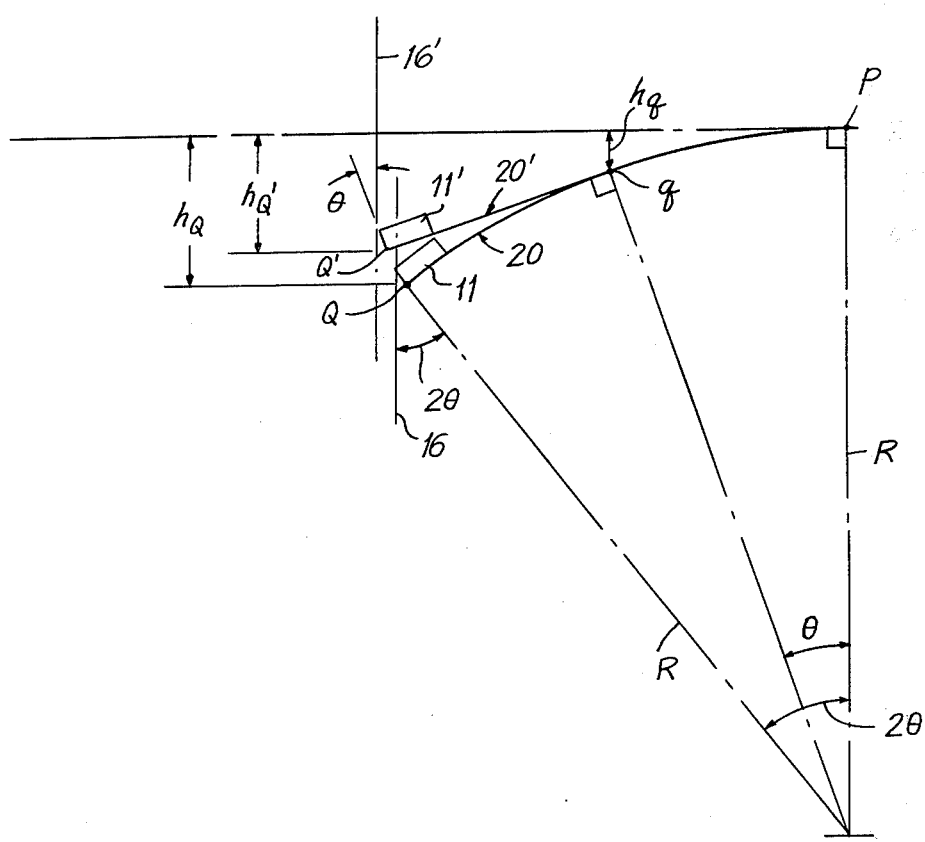
FIG. 8 is a diagrammatic view which compares the contact angle errors occurring upon lateral deflection of a head mounted on a cantilevered support member according to the prior art, and according to the present invention, respectively.

Having reference to FIG. 8, the movements of the active face of head 11 mounted on support member 20 according to the prior art, as described above with reference to FIG. 3, will now be compared with the movements of the active face of head 11' mounted on support member 20' according to this invention. It is assumed, for the purposes of such comparison, that the distance from the fixed point P (corresponding to the clamped end 20a of support member 20) to the movable point Q (corresponding to the active face of head 11) is the same as the distance between the points P and Q' which respectively represent the fixed or clamped end 20'a of support member 20' and the active face of the head 11' mounted thereon. In the case of support member 20 according to the prior art, when a drive signal is applied to its conductive layers 23 and 24, the bi-morph lead bends or arcuately flexes along its entire length from the fixed point P to the movable point Q, with such arcuate flexing having a constant radius of curvature R. On the other hand, as previously indicated, when the same drive signal is applied to the conductive layers 23' and 24' of support member 20', the latter is made to flex arcuately with the radius of curvature R only from the fixed point P to the intermediate point q which is approximately midway between the opposite ends of support member 20'. The portion of support member 20' from which conductive layers 23' and 24' are absent, that is, from the intermediate point q to the movable end Q', is not bent, but remains flat and substantially tangential to the curvature of member 20' at the intermediate point q.

Considering now the contact angle errors of the heads 11 and 11' in respect to the surface of the magnetic tape indicated at 16 and 16' on FIG. 8, it will be seen that if the angle enclosed by the circular arc extending from the point P to the point Q in the case of the support member 20 is $2\theta$, then the corresponding angle for the arc from the fixed point P to the intermediate point q in the case of the support member 20' according to this invention is $\theta$. Accordingly, the contact angle or the angular deviation of the active face of head 11' fixed to the free end of support member 20' relative to the record surface of magnetic tape 16' is only $\theta$, whereas the corresponding angular deviation in the case of head 11 fixed to support member 20 according to the prior art is $2\theta$.

Comparing now the deflections $h_Q$ and $h_{Q'}$ of the free end points Q and Q', respectively, of the support members 20 and 21' when subject to a predetermined drive signal, it will be seen that such deflections are represented by the abscissas measured from the horizontal line passing through the point P on FIG. 8. In each case, the deflection $h_q$ at the midpoint q of the member 20 or 20' can be written as below (assuming that each of $\theta$ and $\theta/2$ is a sufficiently small value so that $\sin \theta/2$ and $\sin \theta$ can be replaced by $\theta/2$ and $\theta$, respectively):

$$h_q \doteq \sin \theta/2 \ (R \sin \theta) \doteq (R\theta^2/2) \tag{1}$$

If $2\theta$ is substituted for $\theta$ in equation (1), the deflection $h_Q$ at the free end of the support member 20 according to the prior art is written as:

$$h_Q \div 2R\theta^2 \quad (2)$$

On the other hand, the deflection $h_Q$, at the free end of the support member 20' according to this invention is determined as follows (assuming once again that $\sin \theta$ is replaceable by $\theta$):

$$h_{Q'} \approx h_q + \sin \theta \, (R \sin \theta) \quad (3)$$

$$\approx \frac{R\theta^2}{2} + R\theta^2$$

$$h_{Q'} \approx 3/2 \, R\theta^2$$

Comparing equations (2) and (3), the ratio of $h_{Q'}$ to $h_Q$ is determined as:

$$h_{Q'}/h_Q \div 3/2 \, R\theta^2/2R\theta^2$$

$$h_{Q'}/h_Q \div \tfrac{3}{4} \quad (4)$$

Therefore, if the support members 20 and 20' are of the same lengths, the fact that the conductive layers 23' and 24' are provided only on the inner half of the length of member 20', that is, from the fixed end to the intermediate point q, will only reduce the deflection at the free end by ¼, as compared with the deflection at the free end of the prior art member 20 having the conductive layers 23 and 24 along the complete length thereof. Although the deflection is reduced by only ¼, the contact angle error is reduced far more, that is, the contact angle error ($\theta$) for support member 20' is only ½ that ($2\theta$) for support member 20. Therefore, signal losses due to reduced signal coupling between the head 11' and the tape 16' are very substantially decreased to ensure a stable reproduced picture with only a relatively small reduction in the maximum deflection of the head from its neutral position.

Moreover, since the conductive layers 23' and 24' are absent from the free end portion of support member 20' at which head 11' is mounted, there is no need to provide any insulating material between such head 11' and the conductive layers or electrodes 23' and 24'. Further, by reason of the absence of the conductive layers 23' and 24' from the outer half of support member 20', the weight of the latter can be reduced by approximately one-half the weight of the conductive layers 23 and 24 of support member 20. Therefore, support member 20' according to this invention can have a very substantially improved or more rapid response characteristic. The reduced area of the conductive layers 23' and 24' of the support member 20' according to this invention also decreases the electrostatic capacity of the resulting bi-morph leaf, and thereby makes it possible to simplify the drive circuit therefor. Since the magnetic head or chip 11' is mounted on the free end portion of support member 20' which does not bend or arcuately flex in operation, the secure adhesive bonding or attachment of the head 11' to support member 20' is facilitated.

Referring now to FIG. 7, it will be seen that a head support member 20" according to another embodiment of this invention has the various parts corresponding to those described above with reference to FIGS. 5 and 6 identified by the same reference numerals but with a double prime appended thereto. Thus, the support member 20" is again mounted at one end 20"a, for example, by clamping to a base shoe member indicated diagrammatically at 26", for rotation with a rotary portion of a tape guide drum, and the respective transducer or head 11" is secured on the opposite or free end 20"b of support member 20" so as to be in transducing relation to a tape wound about such guide drum. Since the outer or free end portion of support member 20" is not required to flex or bend during operation of support member 20", there is no need to provide such outer or free end portion with the ferroelectric or piezoelectric ceramic members. Thus, in support member 20", the piezoelectric ceramic members 21" and 22" extend only from the fixed end 20"a of support member 20" to approximately the midpoint of the length of the latter and are suitably bonded to the opposite surfaces of the central vane member or conductive substrate 25" which is coextensive with the full length of member 20" and has the head 11" directly bonded to its free end portion. The piezoelectric ceramic members 21" and 22" have conductive layers or electrodes 23" and 24" suitably bonded to their outer surfaces, and such conductive layers 23" and 24" are trapezoidal, similarly to the corresponding layers 23' and 24' of FIGS. 5 and 6. However, in the case of support member 20", the conductive layers 23" and 24" are coextensive with the respective piezoelectric ceramic members 21" and 22".

The piezoelectric ceramic members 21" and 22" and the central vane member 25" may be constructed of the same materials specifically mentioned above as being advantageously employed for the corresponding parts in support member 20'. However, in the case of support member 20", the opposite surfaces of the outer half of vane member 25" are free of the members 21" and 22" and are preferably covered by layers 30 and 31 of a material, for example, a lightweight plastic, which is lighter and stiffer than the piezoelectric or ferroelectric material employed for the members 21" and 22".

Although the support members 20' and 20" according to this invention have been described above and shown on FIGS. 5 and 6 and FIG. 7, respectively, as having their conductive layers 23' and 24' or 23" and 24" formed only on the inner half of the support member, such conductive layers can extend over larger proportions of the length of the support member so long as the conductive layers are absent from the free end portion of the support member at which the magnetic head or chip is mounted whereby to exclude arcuate flexing of the support member from its outer end portion.

The relation of the contact angle error to the length of the conductive layers will now be analyzed with reference to the below formulas:

$$R \cdot \theta = 1 \quad (5)$$

$$R - R \cdot \cos \theta = d_1 \quad (6)$$

$$(L-1) \cdot \sin \theta = d_2 \quad (7)$$

$$d = d_1 + d_2 \quad (8)$$

in which R and $\theta$ have the meanings shown in FIG. 8, l is the length of the support member provided with conductive layers or electrodes, L is the total length of the support member, d is the total deflection at the free end, and $d_1$ and $d_2$ are the portions of such deflection due to arcuate flexing at the length l and due to the straight or flat portion of the support member at the length $L-l$.

Substituting equation (5) in equation (6) leads to:

$$d_1 = \frac{l}{\theta}(1 - \cos\theta) \tag{9}$$

$$\approx \frac{l}{\theta}\{1 - (1 - \theta^2/2)\}$$

$$d_1 \approx \frac{l\theta}{2}$$

Equation (7) can be simplified to:

$$(L - l)\theta \approx d_2 \tag{10}$$

$$\approx d - d_1$$

$$(L - l)\theta \approx d - \frac{l\theta}{2}$$

Therefore, $\theta \approx \frac{d}{L - l/2}$

Figure 9:
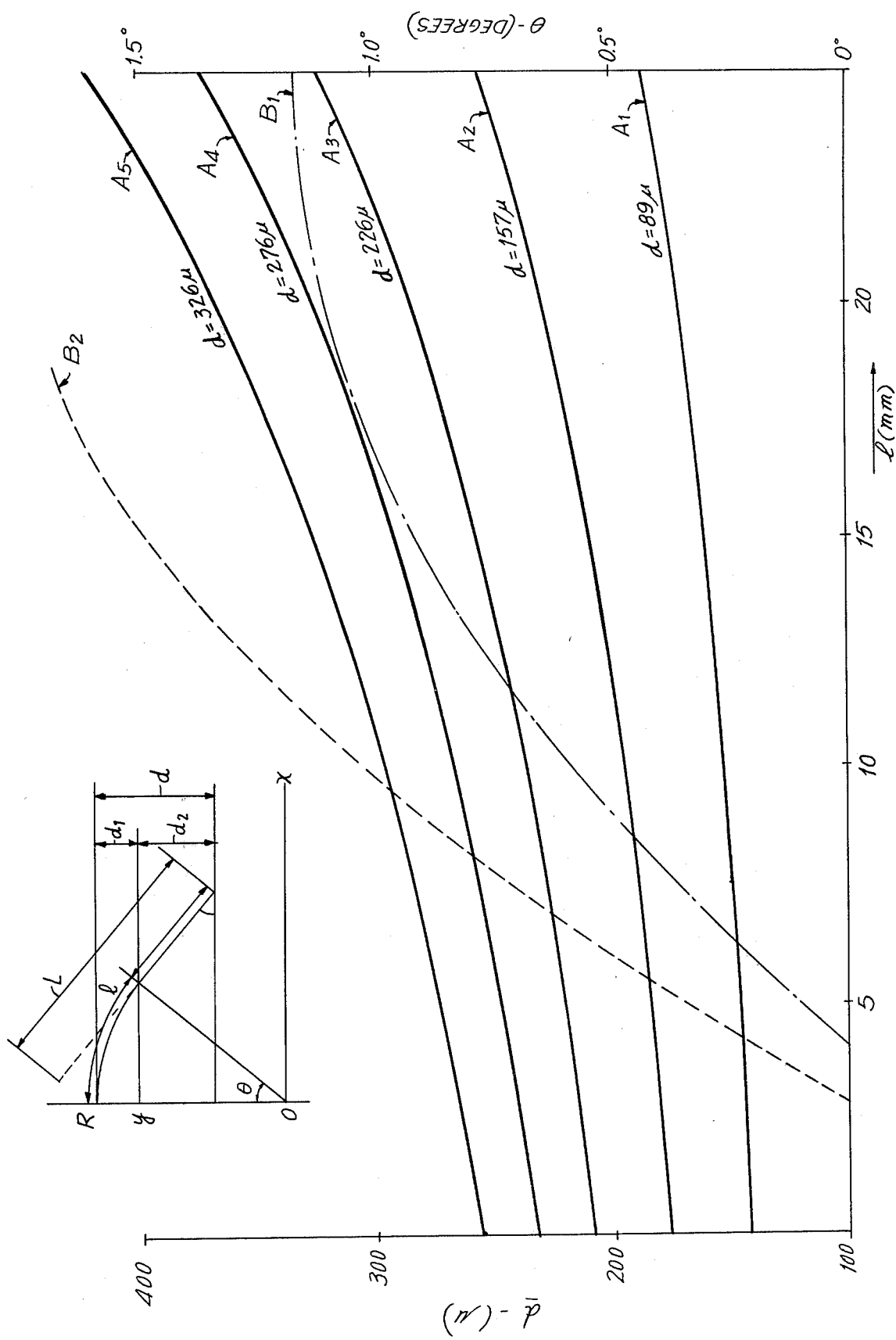
FIG. 9 is a graph illustrating various characteristics of head support members according to this invention.

The relationship between $\theta$ and $l$ is shown by the five solid-line curves $A_1$–$A_5$ on FIG. 9 for various values of d, that is, for various amounts of deflection at the free end of the support member, ranging from $89\mu$ to $326\mu$. More particularly, the curves $A_1$–$A_5$ on FIG. 9 are based on a support member having a total length L=24 mm, and the respective values of d have been selected to be $(n+\frac{1}{2})$ times the track pitch in a helical scan VTR of the type available from Sony Corporation under the trademark U-Matic.

It will be apparent from curves $A_1$–$A_5$ on FIG. 9 that, when L is 24 mm, the contact angle error $\theta$ increases gradually for values of l greater than 10 mm. Further, $\theta$ increases exponentially when l is more than 20 mm. Therefore, a suitable range of values for the ratio l/L can be determined as follows:

(10 mm/24 mm)×100÷41.6%

(20 mm/24 mm)×100÷83.3%

Therefore, it is preferable that the ratio l/L be in the range between approximately 40% and approximately 85%.

Considering now a support member or bi-morph structure according to this invention in which the piezoelectric members 21' and 22' are bonded to opposed surfaces of a central vane member 25' of carbon fibers having a thickness of $120\mu$, to provide a support member with a total thickness of 0.55 mm. and a total length of 24 mm., it will be seen that the curve $B_1$ shown in dot-dash lines on FIG. 9 represents the relationship of deflection d at the free end to the length l of the conductive layers 23' and 24' for the case where a drive signal of 60 Hz and 300 $V_{PP}$ (volts peak to peak) is applied to the bi-morph structure. The curve shown in dotted lines at $B_2$ on FIG. 9 similarly represents the relationship of deflection d at the free end to the length l for the case where the 60 Hz drive signal has an amplitude of 400 $V_{PP}$.

From the curve $B_1$ it is apparent that, for values of l greater than about 20 mm., the displacement or deflection d of the free end does not exhibit any substantial further increase. On the other hand, for values of l less than about 10 mm., the deflection d decreases linearly and is undesirably low. From curve $B_2$ it is apparent that, even if the value l is only about 12 mm., that is, the conductive layers 23' and 24' or 23" and 24" extend for about one-half the length of the support member 20' or 20" according to this invention, no difficulty is experienced in achieving a deflection d of more than $300\mu$ merely by increasing the applied voltage, for example, to 400 $V_{PP}$.

Having described a number of illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A head assembly comprising
  a cantilevered support member having a first portion at which said support member is adapted to be mounted,
  magnetic transducer means secured to said support member at a free end portion of the latter remote from said first portion,
  at least a part of said support member extending from said first portion toward said free end portion being electrostrictive, and
  conductive layers on at least a portion of said electrostrictive part of the support member for causing flexing thereof in response to application of a drive signal to said conductive layers, said electrostrictive part having said conductive layers thereon for a distance from said first portion which is only a fraction of the distance between said first and free end portions so as to exclude said free end portion from flexing in response to said drive signal.

2. A head assembly according to claim 1; in which said fraction is in the range from approximatey 40/100 to 85/100.

3. A head assembly according to claim 1; in which said electrostrictive part of the support member is substantially coextensive with said distance between said first and free end portions of the latter, and said conductive layers cover substantially less than the full surface areas of said electrostrictive part of the support member.

4. A head assembly according to claim 1; in which said conductive layers are substantially coextensive with surfaces of said electrostrictive part of the support member, and said electrostrictive part extends from said first portion only said distance which is a fraction of the distance between said first and free end portions.

5. A head assembly according to claim 4; in which said support member further includes a non-electrostrictive part extending from said electrostrictive part to said free end portion, and said magnetic transducer means is mounted directly on said non-electrostrictive part.

6. A head assembly according to claim 1; in which said electrostrictive part of the support member is constituted by a bi-morph leaf element.

7. A head assembly according to claim 6; in which said bi-morph leaf element includes a central vane member and two piezoelectric ceramic members bonded between said conductive layers to opposite surfaces of said vane member.

8. A head assembly according to claim 7; in which said vane member and said piezoelectric ceramic members are substantially coextensive with said distance between said first and free end portions of the latter, and said conductive layers cover substantially less than the full areas of said piezoelectric ceramic members.

9. A head assembly according to claim 8; in which said magnetic transducer means is bonded directly to one of said piezoelectric ceramic members at a surface portion of the latter at said free end portion which is uncovered by said conductive layers.

10. A head assembly according to claim 7; in which said piezoelectric ceramic members and said conductive layers are substantially coextensive and extend from said first portion only said distance which is a fraction of the distance between said first and free end portions, and said vane member extends beyond said piezoelectric ceramic members to said free end portion at which said magnetic transducer means is mounted thereon.

11. A head assembly according to claim 10; in which said vane member extending beyond said piezoelectric ceramic members is included in a non-electrostrictive part of said support member which further has layers on said vane member of a material relatively lighter, in weight, than said piezoelectric ceramic members.

12. A head assembly comprising a cantilevered support member having a first portion at which said support member is adapted to be mounted, at least a part of said support member being constituted by a bi-morph leaf element which extends from said first portion toward a free end portion of the support member remote from said first portion,
magnetic transducer means secured to said support member at said free end portion, and
conductive layers bonded to opposite surfaces of said bi-morph leaf and being absent from at least said free end portion of the support member for causing a flexing of said bi-morph leaf between said conductive layers in response to application of a drive signal to said conductive layers and to prevent at least said free end portion of the support member to which said transducer means is secured from flexing in response to said drive signal.

13. A head assembly according to claim 12; in which each of said conductive layers extends from said first portion in the direction toward said free end portion of the support member for a distance which is from approximately 40% to approximately 85% of the dimension measured from said first portion to said free end portion.

14. A head assembly according to claim 13; in which said bi-morph leaf element includes a central vane member and two piezoelectric ceramic members bonded between said conductive layers to opposite surfaces of said vane member.

15. A head assembly according to claim 14; in which said vane member and said piezoelectric ceramic members are substantially coextensive with said dimension measured from said first portion to said free end portion, and said conductive layers cover substantially less than the full extent of said piezoelectric ceramic members in the direction of said dimension.

16. A head assembly according to claim 15; in which said magnetic transducer means is constituted by a magnetic head chip adhesively bonded directly to one of said piezoelectric ceramic members at a surface portion of the latter free of said conductive layers.

17. A head assembly according to claim 14; in which said piezoelectric ceramic members and said conductive layers are substantially coextensive in the direction of said dimension and extend from said first portion only said distance which is from approximately 40% to approximately 85% of said dimension, and said vane member extends beyond said piezoelectric ceramic members and has said magnetic transducer means adhesively bonded thereto at said free end portion of the support member.

18. An apparatus for mounting a magnetic transducing head in transducing relation to an elongated track on a magnetic record medium comprising:
a mounting structure movable relative to said record medium generally in the direction along said track;
a cantilevered support member having one end portion secured to said mounting structure for movement with the latter relative to the record medium, and an opposite end portion at which said magnetic transducing head is secured in transducing relation to said record medium, at least a part of said support member extending from said one end portion being electrostrictive for displacement of said head in directions lateral of said track in response to flexing of said electrostrictive part; and
conductive layers on said electrostrictive part of the support member for causing flexing of said electrostrictive part between the layers upon application of a drive signal to said conductive layers, at least said opposite end portion of the support member at which said head is secured being free of said conductive layers such that at least said opposite end portion does not flex in response to said drive signal.

19. An apparatus according to claim 18; in which each of said conductive layers extends from said one end portion in the direction towards said opposite end portion for a distance which is from approximately 40% to approximately 85% of the dimension measured from said one end portion to said opposite end portion.

20. An apparatus according to claim 19; in which said electrostrictive part is constituted by a bi-morph leaf element including a central vane member and two piezoelectric ceramic members bonded between said conductive layers to opposite surfaces of said vane member.

21. An apparatus according to claim 20; in which said vane member and said piezoelectric ceramic members are substantially coextensive with said dimension measured from said one end portion to said opposite end portion, said conductive layers cover substantially less than the full extent of said piezoelectric ceramic members in the direction of said dimension, and said head is adhesively bonded directly to one of said piezoelectric ceramic members at a surface portion thereof which is free of said conductive layers.

22. An apparatus according to claim 20; in which said piezoelectric ceramic members and said conductive layers are substantially coextensive in the direction of said dimension and extend from said first portion only said distance which is from approximately 40% to approximately 85% of said dimension, and said vane member extends beyond said piezoelectric ceramic members and has said magnetic transducer head adhesively bonded thereto at said marginal second portion of the support member.

23. An apparatus according to claim 18; in which said record medium is a magnetic tape having said elongated track extending obliquely thereon and being preceded and followed by similar tracks which are parallel thereto, and said mounting structure includes a rotatable guide drum portion having said tape extending helically about at least a part of its circumference while the tape is adapted to be advanced.

* * * * *